United States Patent [19]
Swan et al.

[11] Patent Number: 6,124,899
[45] Date of Patent: Sep. 26, 2000

[54] METHOD AND APPARATUS FOR ENCODING VIDEO COLOR INFORMATION

[75] Inventors: Philip L. Swan, Toronto; Antonio A. Rinaldi, Maple, both of Canada

[73] Assignee: ATI International, West Indies

[21] Appl. No.: 08/761,642

[22] Filed: Dec. 6, 1996

[51] Int. Cl.[7] ..................................................... H04N 9/65
[52] U.S. Cl. ......................... 348/642; 348/651; 348/654
[58] Field of Search .................................. 348/641, 642, 348/645, 646, 651, 654, 488; 375/261, 298, 264

[56] References Cited

U.S. PATENT DOCUMENTS

| | | | |
|---|---|---|---|
| 4,587,552 | 5/1986 | Chin | 348/651 |
| 4,982,179 | 1/1991 | Ogawa et al. | 348/642 |
| 5,359,368 | 10/1994 | Srivastava | 348/646 |

OTHER PUBLICATIONS

Keith Jack, *Video Demystified*, A Handbook for the Digital Engineer, Second Edition, Chapter 5, NTSC/PAL Digital Encoding, pp. 132–232, Copyright© 1996 by HighText Interactive, Inc., San Diego, CA 92121.

*Primary Examiner*—Victor R. Kostak
*Attorney, Agent, or Firm*—Markison & Reckamp

[57] ABSTRACT

The invention features furnishing a representation of the quadrature amplitude modulation of two input signals (e.g., U and V video signals) based on the phase of a reference signal (e.g., a color burst reference signal). The two input signals are scaled based on the phase of the reference signal, and the scaling is synchronized to the phase of the reference signal.

19 Claims, 7 Drawing Sheets

| SubCarrierPhase | U x Sin(2pfsc) | V x Cos(2pfsc) | Chroma | Select U | Select V | Neg U | Neg V | Uby2_7Vby8 |
|---|---|---|---|---|---|---|---|---|
| 0 | 0 | V | V | 0 | 1 | 0 | 0 | 0 |
| 1 | U/2 | 7V/8 | U/2 + 7V/8 | 0 | 0 | 0 | 0 | 1 |
| 2 | 7U/8 | V/2 | 7V/8 + V/2 | 0 | 0 | 0 | 0 | 0 |
| 3 | U | 0 | U | 1 | 0 | 0 | 0 | 0 |
| 4 | 7U/8 | -V/2 | 7U/8 - V/2 | 0 | 0 | 0 | 1 | 0 |
| 5 | U/2 | -7V/8 | U/2 - 7V/8 | 0 | 0 | 0 | 1 | 1 |
| 6 | 0 | -V | -V | 0 | 1 | 0 | 1 | 0 |
| 7 | -U/2 | -7V/8 | -U/2 - 7V/8 | 0 | 0 | 1 | 1 | 1 |
| 8 | -7U/8 | -V/2 | -7U/8 - V/2 | 0 | 0 | 1 | 1 | 0 |
| 9 | -U | 0 | -U | 1 |  | 1 | 0 | 0 |
| 10 | -7U/8 | V/2 | -7U/8 + V/2 | 0 | 0 | 1 | 0 | 0 |
| 11 | -U/2 | 7V/8 | -U/2 + 7V/8 | 0 | 0 | 1 | 0 | 1 |

FIG. 4

| SubCarrierPhase | U x Sin (2pif$_{sc}$) | V x Cos(2pif$_{sc}$) | Select V | Neg |
| --- | --- | --- | --- | --- |
| 0 | 0 | V | 1 | 0 |
| 1 | U | 0 | 0 | 0 |
| 2 | 0 | -V | 1 | 1 |
| 3 | -U | 0 | 0 | 1 |

FIG. 7

METHOD AND APPARATUS FOR ENCODING VIDEO COLOR INFORMATION

BACKGROUND OF THE INVENTION

The invention relates to encoding video color information.

The colors of a video image may each be uniquely defined by the characteristics of luminance, hue and saturation. The luminance represents the intensity, or brightness, of the color. The hue represents the dominant electromagnetic wavelength of the color, and the saturation represents the degree to which the hue is mixed with white. In accordance with these characteristics, for purposes of encoding color for transmission via a video signal, each color may be represented in YUV color space. The luminance of each color is represented by the Y component, and the hue and saturation of each color are jointly represented by a linear combination of the U and V components.

As shown in FIG. 1, a video signal typically has successive horizontal timing cycles 12. Each horizontal timing cycle 12 has an active region 15 representing the image information for one horizontal scan line on the screen of a television. Within the active region 15, the magnitude of a signal 14 is representative of the time varying Y component (i.e., the luminance) for the scan line. For purposes of encoding the time varying U and V components (i.e., the time varying hue and saturation) into the active region 15, a much smaller magnitude and higher frequency signal, typically referred to as a chroma signal 16, is added to the signal 14. The phase difference between the chroma signal 16 and a subcarrier reference signal 18 of the same frequency represents the hue, and the magnitude of the chroma signal 16 represents the saturation.

The chroma signal 16 is generated by the quadrature amplitude modulation (QAM) of a U signal (representative of the U component) and a V signal (representative of the V component) which may be represented by the following equation:

$$\text{CHROMA} = U \sin(wt) + V \cos(wt),$$

where w is the radian frequency of the subcarrier reference signal 18.

As shown in FIG. 2, the quadrature amplitude modulation of the U and V signals is typically accomplished by using the phase of the subcarrier reference signal 18 to look up the sine and cosine components of the chroma signal via a sine look-up table 20 and a cosine look-up table 22. A multi-input multiplier 24 multiplies the U signal by the output of the sine look-up table 20, and another multi-input multiplier 25 multiplies the V signal by the output of the cosine look-up table 22. The products of the multipliers 24 and 25 are furnished to an adder 27 which sums the products together to form the chroma signal 16.

SUMMARY OF THE INVENTION

In one aspect, the invention features furnishing a representation of the quadrature amplitude modulation of two input signals based on the phase of a reference signal. The two input signals are scaled based on the phase of the reference signal, and the scaling is synchronized to the phase of the reference signal.

In preferred embodiments, the scaling occurs when the phase is equal to one of a predetermined set of values (e.g., the phase is equal to a multiple of one twelfth the period of the reference signal). The representation (e.g., a video chroma signal) is a 12X sampling of the quadrature amplitude modulation of the two input signals in one embodiment; however, in other embodiments, the representation may be a 6X or 4X sampling.

In one aspect, the invention features a modulator that furnishes a representation (e.g., a sampled version) of the quadrature amplitude modulation of two input signals (e.g., U and V video signals) based on the phase of a reference signal (e.g., a subcarrier reference signal). The modulator includes an output bus furnishing the representation and scalar multipliers. Selection logic of the modulator is configured to receive an indication of the phase and interact with the switch network to selectively couple the multipliers between the signals and the bus based on the indication. Thus, multiplication of the input signals by a sine or cosine signal may be achieved without look-up tables or multi-signal multipliers.

In preferred embodiments, the representation furnished by the modulator may be a 12X or 4X sampling of the quadrature amplitude modulation, and the input signals are multi-bit digital signals. The modulator has an adder configured to sum the outputs of at least two of the multipliers and furnish the resultant output to the bus. The switch network is also configured to selectively connect the input signals to the bus based on the indication of the phase. Two of the scalar multipliers are inverters (i.e., two's complement circuits), and two of the scalar multipliers are configured to shift the bits of the input signal coupled to the multiplier by the switch network.

The switch network has at least one multiplexer configured to selectively couple the output of one of the scalar multipliers to the bus. The switch network also has at least one multiplexer configured to selectively couple the input signals to the bus.

Among the advantages of the invention are one or more of the following. Due to the synchronization of the phase with the reference signal, only a small number of scaling factors are required. The modulator is compact and inexpensive yet generates a QAM representation with a high sample rate.

Other embodiments will become apparent from the following description and from the claims.

BRIEF DESCRIPTION OF THE DRAWING

FIG. 4 is a table illustrating selected output values for the chroma modulator of FIG. 3.

FIG. 7 is a table illustrating selected output values for the chroma modulator of FIG. 6.

DESCRIPTION OF THE PREFERRED EMBODIMENTS

Figure 1:
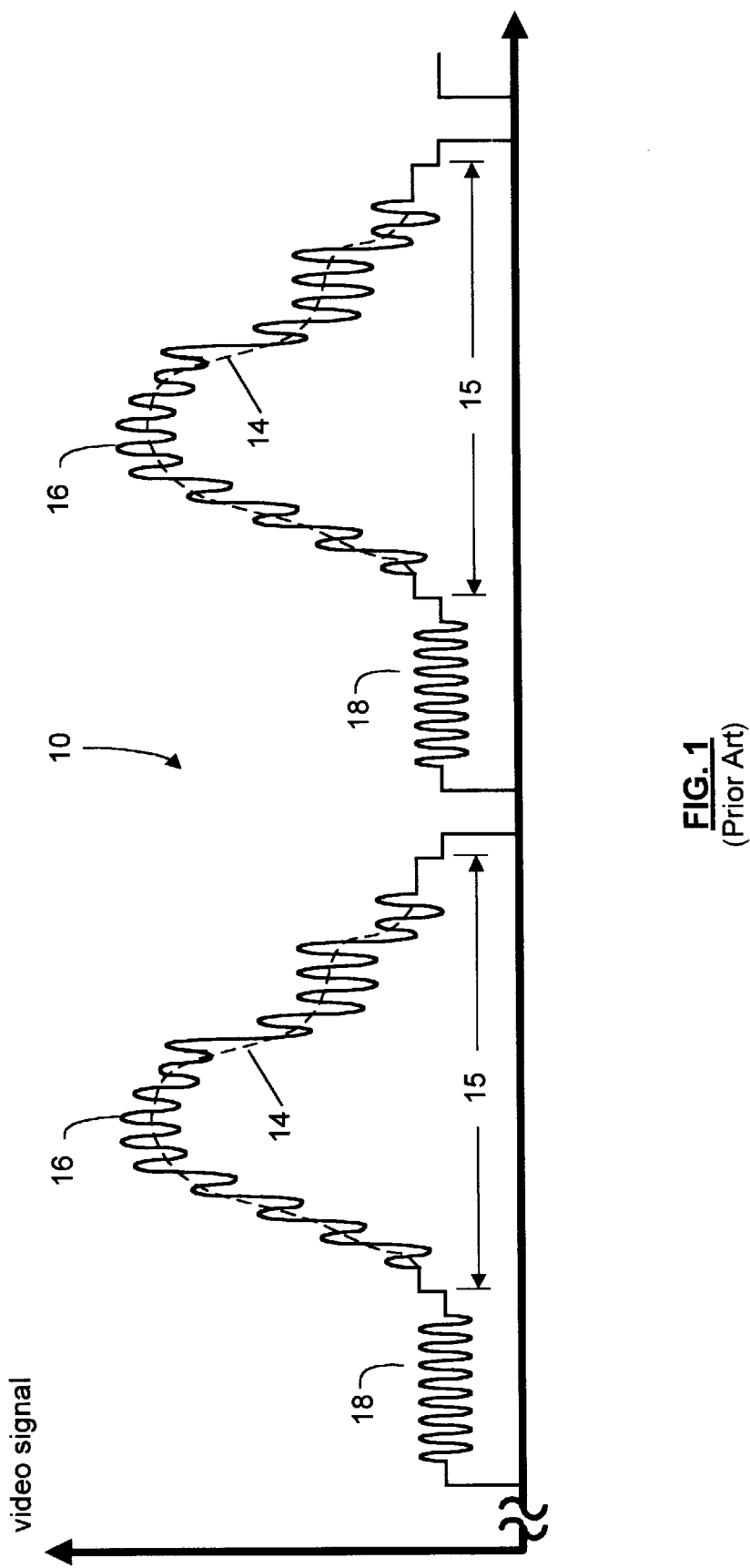
FIG. 1 is a waveform illustrating a video signal.
Figure 2:
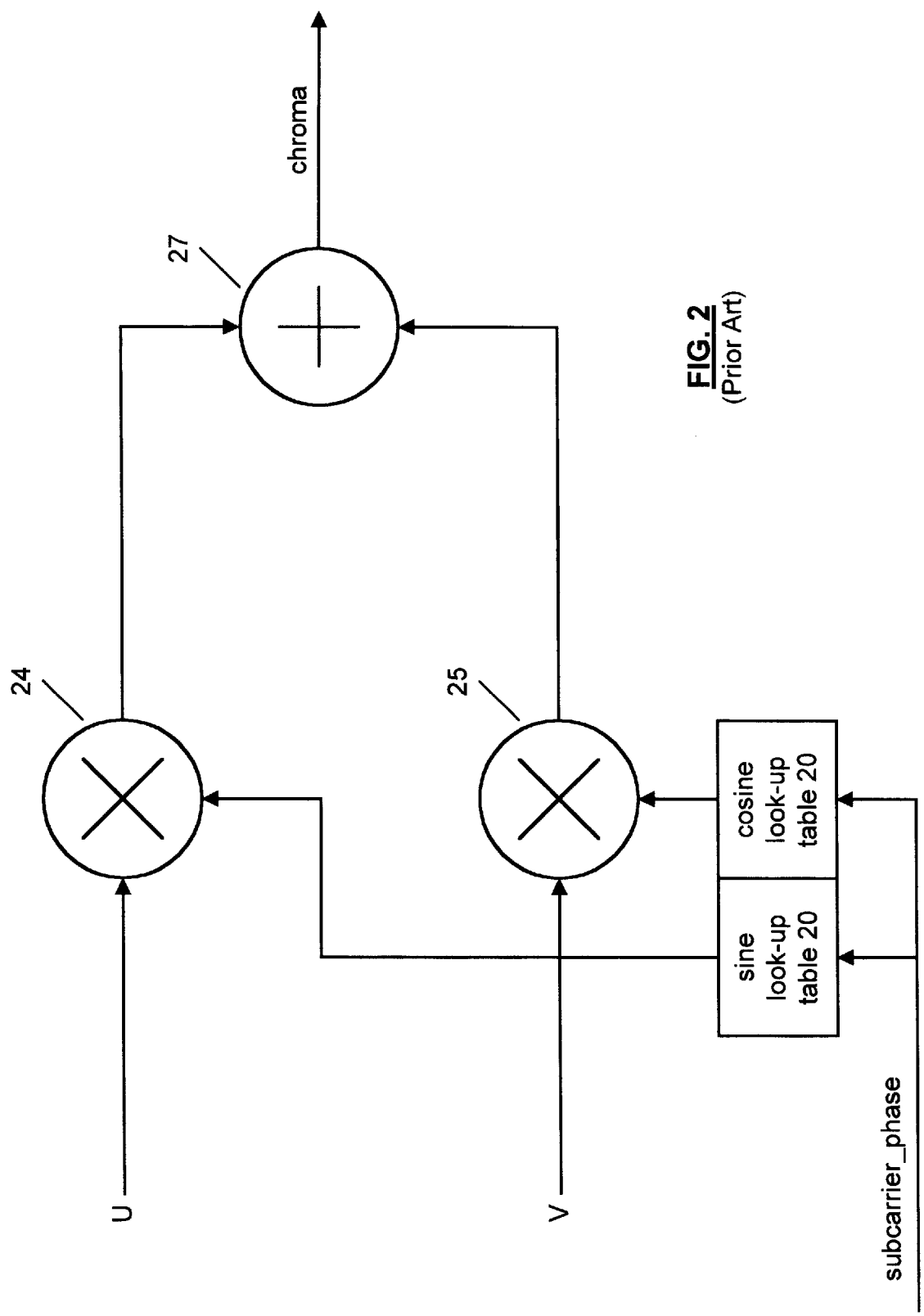
FIG. 2 is a block diagram of a chroma modulator of the prior art.
Figure 3:
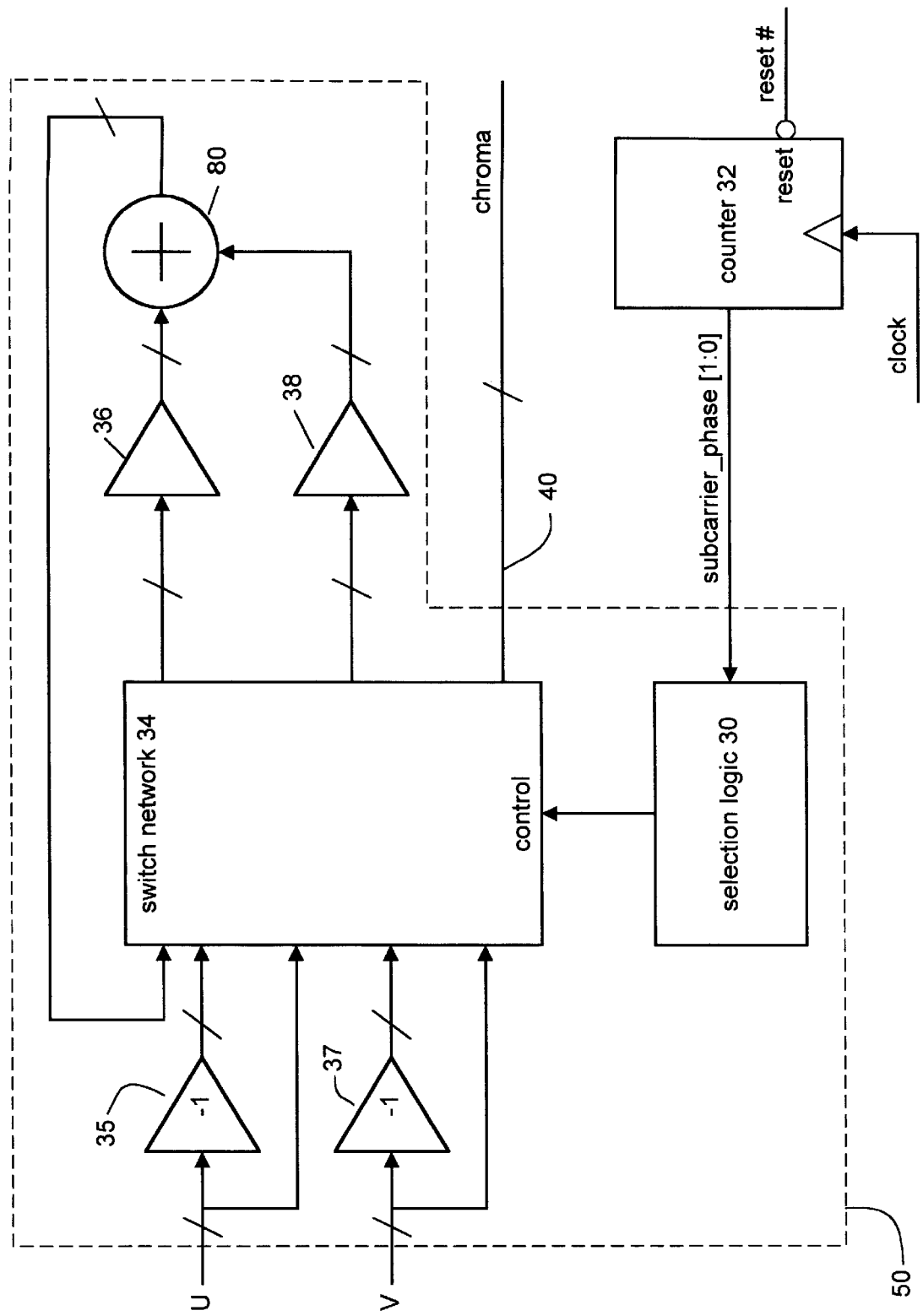
FIG. 3 is a block diagram of a chroma modulator according to one embodiment of the invention.

As shown in FIG. 3, a chroma modulator 50 generates a 12X sampled representation (called CHROMA) of a video chroma signal based on the frequency of a reference subcarrier signal. The chroma modulator 50 effectively takes a 12X sampling of the subcarrier signal and uses the sampled values to furnish the sine and cosine components for each value of the CHROMA representation. The operation of the chroma modulator 50 is synchronized to the phase of the subcarrier signal. Because of this synchronization, the sampled values of the subcarrier signal (and the cosine and sine components of the CHROMA representation) repeat for every cycle of the subcarrier signal. By confining the sampled values of the subcarrier signal to a predetermined set, the chroma modulator 50 does not require sinusoidal look-up tables 20 and 22 to store scaling factors or multi-bit multipliers 24 and 25 to apply the scaling factors.

The chroma modulator 50 takes advantage of the synchronization to the subcarrier signal by using a few multiplexers, bit shifters, and adders to scale U and V by a small set of scaling factors for each value of the CHROMA representation. The chroma modulator 50 uses a switch network 34 to selectively couple four scalar multipliers 35–38 between multi-bit U and V signals (representative of the U and V components, respectively, of the YUV color space) and an output bus 40. The scalar multipliers 36 and 38 have a positive gain of less than one, and the scalar multipliers 35 and 37 have a negative gain of one. The signal paths created by the switch network 34 emulates the multiplication of the U and V signals by sin(wt) and cos(wt), respectively (where w is the radian frequency of the reference subcarrier signal).

The switching by the switch network 34 is controlled by selection logic 30. Taking into account the gain of each of the scalar multipliers 35–38, the selection logic 30 interacts with the switch network 34 to selectively route the signals U and V through the scalar multipliers 35–38 based on the phase of the reference subcarrier signal. The outputs of the scalar multipliers 36 and 38 are summed by an adder 80, and the output of the adder 80 is selectively coupled to the bus 40 by the switch network 34.

The selection logic 30 receives an indication of the phase of the reference subcarrier through a multi-bit signal called SUB_CARRIER_PHASE[3:0] furnished by a four bit counter 32. When not in reset, the counter 32 increments the SUB_CARRIER_PHASE[3:0] on each cycle of a clock signal CLK. Because the CHROMA representation is representative of a 12X sampling of the quadrature amplitude modulation of the U and V signals, the clock signal is synchronized to and has a frequency twelve times that of the subcarrier signal. When the phase of the reference subcarrier signal is equal to "0," the counter 32 is reset (i.e., the SUB_CARRIER_PHASE[3:0] signal is set equal to "0"). The counter 32 then subsequently counts from "0" to "11" in a circular fashion, i.e., divides the phase into twelve regions. Therefore, one clock cycle after the SUB_CARRIER_PHASE[3:0] signal is equal to "11," the SUBCARRIER_PHASE[3:0] signal is set equal to "0."

As shown in FIG. 4, the chroma modulator 50 takes advantage of several observations of the mathematical properties of sine and cosine when both functions have identical frequencies and phases. First, the U and V signals are never routed though the same scalar multipliers 36 and 38 because of the fact that sine and cosine are always 90° out of phase relative to each other. Therefore, each of the scalar multipliers 36 and 38 has a unique gain. Second, because the sine function mirrors itself about 90° and 270°, and the cosine function mirrors itself about 180° and 360°, each of the scalar multipliers 35–38 are used more than once during one subcarrier cycle. Third, because the polarity of the sine function changes at 180° and the polarity of the cosine function changes at 90°, the scalar multipliers 35 and 37 are used to invert the U and V signals, respectively, so that the scalar multipliers 36 and 38 may be used for positive and negative gains.

The chroma modulator 50 also takes advantage of the fact that when either the sine or cosine function equals "1" or "−1", the other function is equal to "0." Thus, for this case, the switch network 34 bypasses the scalar multipliers 36 and 38 to furnish the CHROMA representation (which is equal to either the U signal, the inverted U signal, the V signal, or the inverted V signal). Otherwise, the switch network 34 routes the U and V signals through the scalar multipliers 36 and 38, and the CHROMA representation is representative of the output of the adder 80.

Figure 5:
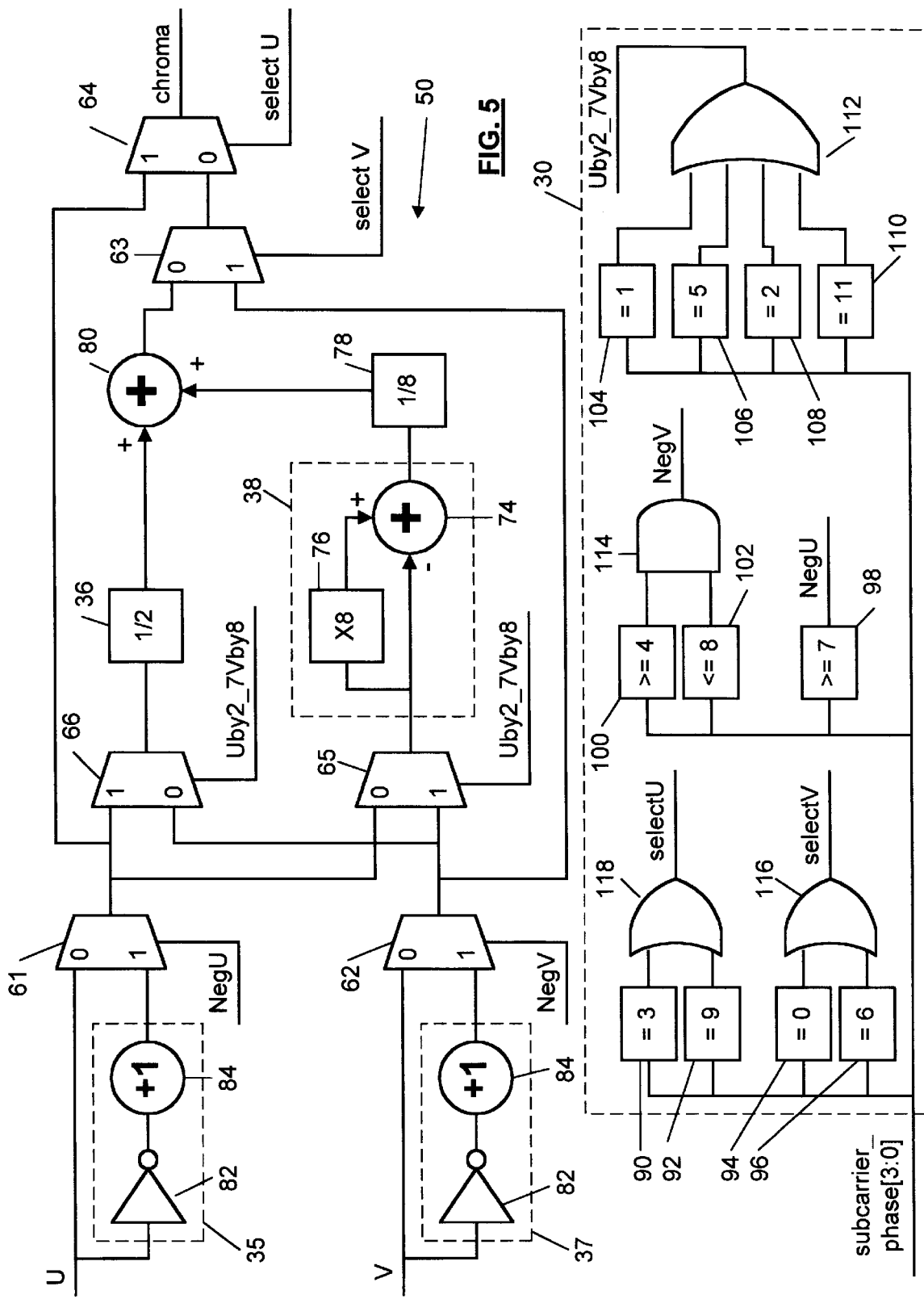
FIG. 5 is a schematic diagram of the chroma modulator of FIG. 3.

As shown in FIG. 5, the U, V and CHROMA representations are multi-bit digital signals and processed by digital logic; however, other embodiments are envisioned in which the analog versions of these signals are processed. In the circuit 50, the scalar multiplier 36 has a gain of "½," and the scalar multiplier 38 has a gain of "⅞."

The scalar multiplier 36 is a digital "divide-by-two" circuit (e.g., a circuit that shifts right the bits received by the circuit by one). The scalar multiplier 38 multiplies a multi-bit input signal by "⅞" by using a digital "multiply-by-eight" circuit 76 (e.g., a circuit that shifts left the bits received by the circuit by three and pads the three least significant bits with zero) to multiply the input signal by "8." An adder 74 of the scalar multiplier 36 subtracts the input signal from the output of the circuit 76 to furnish a signal representative of the input signal multiplied by "7." The output of the adder 74 is received by a "divide-by-eight" circuit 78 (e.g., a circuit that shifts right the bits received by the circuit by three) which provides the output of the scalar multiplier 38.

The scalar multipliers 35 and 37 each contain a multi-bit inverter 82 and a plus one circuit 84 to perform a two's complement (i.e., a negative representation) of the U and V signals, respectively.

The switch network 34 has six multi-bit, two input multiplexers 61–66. The output of the scalar multiplier 35 is furnished to the one input of a multiplexer 61 which selects either the U signal or the inverted U signal. The zero input of the multiplexer 61 receives the U signal. The multiplexer 61 receives a select signal called NegU furnished by the selection logic 30. When the NegU signal is asserted, or driven high, the multiplexer furnishes the inverted U signal to the one input of the multiplexer 66. Otherwise, when the NegU signal is deasserted, or low, the multiplexer 61 furnishes the U signal to the one input of the multiplexer 66.

The output of the scalar multiplier 37 is furnished to the one input of a multiplexer 62 which selects either the V signal or the inverted V signal. The zero input of the multiplexer 62 receives the V signal. The multiplexer 62 receives a select signal called NegV which is furnished by the selection logic 30. When the NegV signal is asserted, or driven high, the multiplexer 62 furnishes the inverted V signal to the one input of the multiplexer 65. When the NegV signal is deasserted, or low, the multiplexer 62 furnishes the V signal to the one input of the multiplexer 65.

The multiplexer 66 selects between furnishing either the output of the multiplexer 61 (i.e., the U signal or the inverted U signal) or the output of the multiplexer 62 (i.e., the V signal or the inverted V signal) to the scalar multiplier 36. When a select signal called Uby2_7Vby8 (furnished by the selection logic 30 to select either the scalar multiplier 36 or 38) is asserted, or driven high, the multiplexer 66 furnishes the output of the multiplexer 61 to the scalar multiplier 36.

Otherwise, when the Uby2_7Vby8 signal is deasserted, or driven low, the multiplexer 66 furnishes the output of the multiplexer 62 to the scalar multiplier 36.

The multiplexer 65 selects between furnishing either the output of the multiplexer 61 (i.e., the U signal or the inverted U signal) or the output of the multiplexer 62 (i.e., the V or the inverted V signal) to the scalar multiplier 38. When the Uby2_7Vby8 signal is asserted, or driven high, the multiplexer 65 furnishes the output of the multiplexer 62 to the scalar multiplier 38. Otherwise, when the Uby2_7Uby8 signal is deasserted, or driven low, the multiplexer 66 furnishes the output of the multiplexer 61 to the scalar multiplier 38.

The output of the multiplexer 64 (and switch network 34) is connected to the bus 40 (i.e., furnishes the CHROMA representation) and receives a selection signal called SelectU (furnished by the selection logic 30 to indicate when the CHROMA representation is representative of the U or inverted U signal). When the SelectU signal is asserted, or driven high, the CHROMA representation is representative of the output of the multiplexer 61. When the SelectU signal is deasserted, or driven low, the CHROMA representation is representation of the output of the multiplexer 63.

The multiplexer 63 selects either the output of the adder 80 or the output of the multiplexer 62. The multiplexer 63 receives a select signal called SelectV (furnished by the selection logic 30 to indicate when the CHROMA representation is representative of either the V signal or inverted V signal). When the SelectV signal is asserted, or driven high, the output of the multiplexer 63 is representative of the output of the multiplexer 62. When the SelectV signal is deasserted, or driven low, the output of the multiplexer 62 is representative of the output of the adder 80.

The selection logic 30 generates the select signals (SelectU, SelectV, NegU, NegV and Uby2_7Vby8) based on the phase of the reference subcarrier signal. The selection logic 30 includes an OR gate 118 which furnishes the SelectU signal. The OR gate 118 receives the output of a comparison circuit 90 which is asserted when the phase is equal to "3." The OR gate 118 also receives the output of a comparison circuit 92 which is asserted when the phase is equal to "9." The SelectV signal is provided by the output of an OR gate 116. The OR gate 116 receives the output of a comparison circuit 94 which is asserted when the phase is equal to "0." The OR gate 116 also receives the output of an equal circuit 96 which is asserted when the phase is equal to "6." The NegU signal is furnished by the output of a "greater-than-or-equal-to" circuit 98 which is asserted when the phase is greater than or equal to "7." The NegV signal is furnished by the output of an AND gate 114 which receives the output of a "greater-than-or-equal-to" circuit 100. The output of the circuit 100 is asserted when the phase is equal to or greater than "4." Another input of the AND gate 114 receives an output of a "less-than-or-equal-to" circuit 102 which is asserted when the phase is less than or equal to "8." The Uby2_7Vby8 signal is furnished by the output of an OR gate 112. One input of the OR gate 112 receives the output of a comparison circuit 104 which is asserted when the phase is equal to "1." Another input of the OR gate 112 receives the output of a comparison circuit 106 which is asserted when the phase is equal to "5." Another input of the OR gate 112 receives the input of an equal circuit 108 which is asserted when the phase is equal to "7." Another input of the OR gate 112 receives the output of a comparison circuit 110 that is asserted when the phase is equal to "11." The select signals provided by the selection logic 30 are otherwise deasserted, or low.

In other embodiments, the chroma signal might be sampled more or less than 12X. For example, as shown in FIG. 7, for a 4X sampling, only the V signal, the inverted V signal, the U signal, and the inverted U signal need to be generated. Therefore, the scalar multipliers 36 and 38 are not required.

Figure 6:
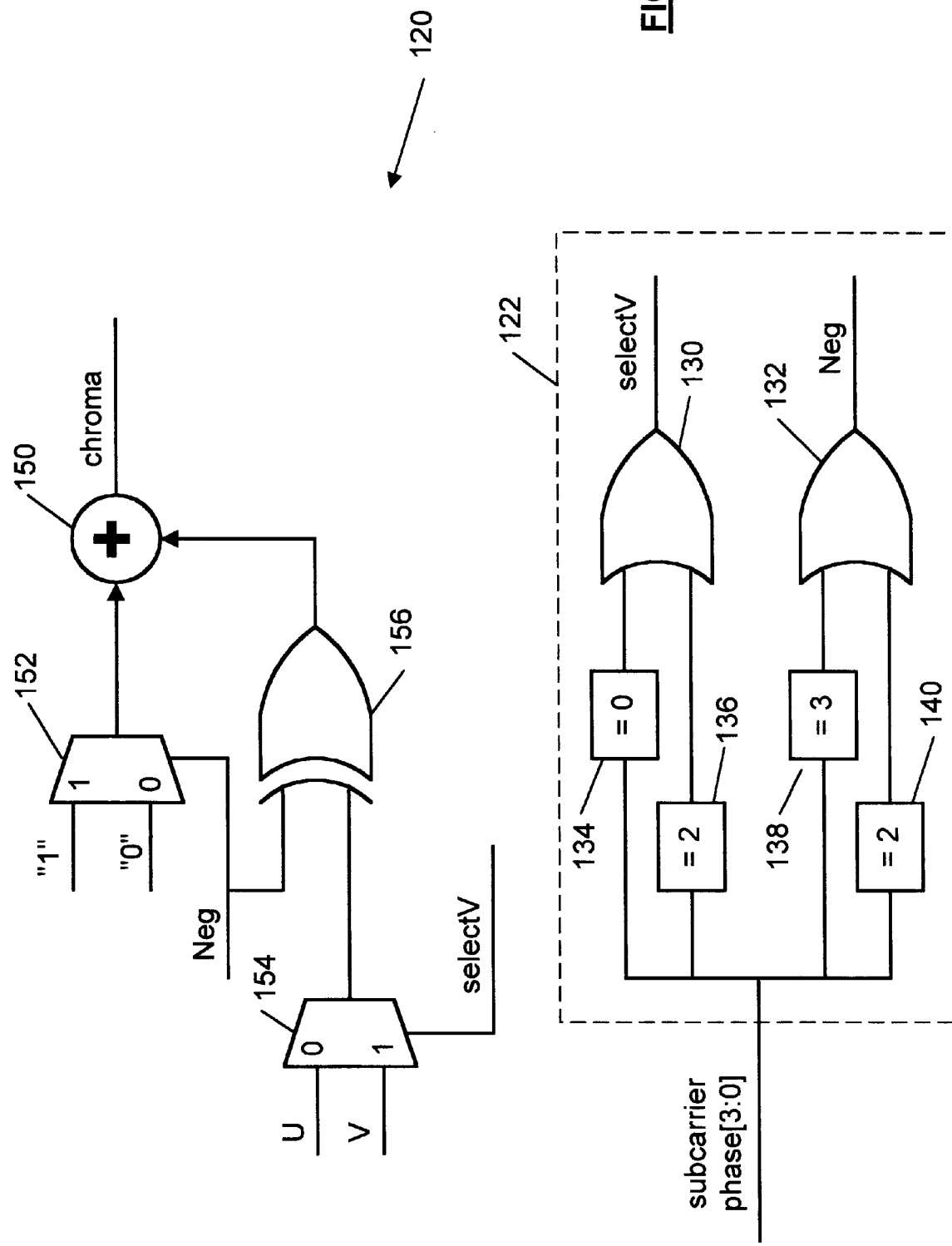
FIG. 6 is a schematic diagram of a chroma modulator according to another embodiment of the invention.

As shown in FIG. 6, a chroma modulator 120 furnishes a 4X sampling of the chroma signal. The circuitry of the chroma modulator 120 includes a multi-bit multiplexer 152 which furnishes a logic one when a signal called Neg is asserted, or driven high. The Neg signal is asserted to indicate when the output of the modulator 120 should be equivalent to logic zero, and the Neg signal is deasserted, or driven low, otherwise. A multi-bit adder 150 receives the output of the multiplexer 152.

The modulator 120 also includes a multi-bit multiplexer 154 which receives the V signal at its one input and the U signal at its zero input. The select input of the multiplexer 154 receives a SelectV signal which is asserted, or driven high, when the output of the modulator 120 should represent (positively or negatively) the V signal, and the SelectV signal is deasserted, or driven low, otherwise. The output of the multiplexer 154 is received by one input of an exclusive OR (XOR) gate 156. Another input of the XOR gate 156 receives the Neg signal. The output of the XOR gate 156 is received by the adder 150. In the chroma modulator 120, a negative representation of a multi-bit signal is indicated by the inversion of the bits of the signal (instead of being indicated by the two's complement of the bits). Therefore, when the Neg signal is asserted, the XOR gate 156 inverts the output of the multiplexer 154 (i.e., the XOR gate 156 inverts the bits of either the U signal or the V signal).

In the selection logic 122, the Selectv signal is furnished by the output of an OR gate 130. One input of the OR gate 130 receives the output of an equal circuit 134 which is asserted when the phase of the subcarrier signal is equal to "0." Another input of the OR gate 130 receives the output of an equal circuit 136 which is asserted when the phase is equal to "2." The Neg signal is furnished by the output of an OR gate 132. One input of the OR gate 132 is furnished by the output of an equal circuit 138 which is asserted when the phase is equal to "3." Another input of the OR gate 132 receives the output of an equal circuit 140 which is asserted when the phase is equal to "2."

Other embodiments are within the scope of the following claims. For example, another chroma modulator might furnish a different sampling, e.g., 6X or 8x, of the chroma signal. Additional scalar multipliers may be selectively coupled between the U and V signals and the adder 80 by the switch network 34.

What is claimed is:

1. A method comprising:

receiving two input signals that are at least partially representative of a video signal;

receiving an indication of phase of a reference subcarrier signal associated with the video signal;

generating select signals based on the indication of phase; and selectively routing the two signals through, or around, multipliers based on the the select signals to provide a representation of quadrature amplitude modulation of the two input signals.

2. The method of claim 1 further comprises scaling the two inputs signals based on the indication of the phase, wherein the scaling is performed by routing the two signals to selected ones of the multipliers, wherein the indication of the phase includes a predetermined set of values.

3. The method of claim 1 further comprises synchronizing the routing of the two signals through the multipliers with the phase of the reference subcarrier signal.

4. The method of claim 1, wherein the representation comprises at least one of a 12X and a 6X sampling of the quadrature amplitude modulation of the two input signals.

5. The method of claim 1, wherein the representation comprises a 4X sampling of the quadrature amplitude modulation of the two input signals.

6. The method of claim 2, wherein the predetermined set of values corresponds to mathematical properties of a sine function, a cosine function, and a sampling rate.

7. A modulator comprising:

an output bus providing a representation of the quadrature amplitude modulation of two input signals based on the phase of a subcarrier signal;

scalar multipliers;

a switch network; and selection logic configured to receive an indication of the phase and interact with the switch network to selectively couple the multipliers between the signals and the bus based on the indication.

8. The modulator of claim 7, wherein the selection logic is further configured to synchronize the coupling of the multipliers with phase of the subcarrier signal.

9. The modulator of claim 7, wherein the representation comprises a 12X sampling of the quadrature modulation of the input signals.

10. The modulator of claim 7, wherein the representation comprises a 6X sampling of the quadrature modulation of the input signals.

11. The modulator of claim 7, wherein the representation comprises a 4X sampling of the quadrature modulation of the input signals.

12. The modulator of claim 7, wherein the scalar multipliers have outputs, the modulator further comprising:

an adder configured to add the outputs of at least two of the multipliers and furnish a resultant output signal to the bus.

13. The modulator of claim 7, wherein the switch network is further configured to selectively connect the input signals to the bus based on the indication of the phase.

14. The modulator of claim 7, wherein at least one of the scalar multipliers comprises an inverter.

15. The modulator of claim 7, wherein the input signals are multi-bit signals, and wherein at least one of the multipliers is configured to shift the bits of the input signal coupled to the multiplier by the switch network.

16. The modulator of claim 7, wherein the switch network comprises at least one multiplexer configured to selectively couple the output of one of the scalar multipliers to the bus.

17. The modulator of claim 7, wherein the switch network comprises at least one multiplexer configured to selectively couple the input signals to the bus.

18. The modulator of claim 7, wherein the scalar multipliers have outputs, the modulator further comprising:

an adder configured to sum at least the outputs of at least two of the multipliers and furnish a resultant output signal to the bus, and wherein the switch network comprises at least one multiplexer configured to selectively couple the input signals to the inputs of the at least two multiplexers.

19. The modulator of claim 7, wherein at least one of the scaler multipliers uses only an inverter.

* * * * *